United States Patent

[11] 3,607,838

| [72] | Inventors | Jorg Strickrodt<br>Heinrick Stoerl Strasse 39/3011, Laatzen;<br>Ullrich Konig, Holbeinstrasse 12/334,<br>Wolfenbuttel, both of Germany |
|---|---|---|
| [21] | Appl. No. | 6,595 |
| [22] | Filed | Jan. 28, 1970 |
| [45] | Patented | Sept. 21, 1971 |

[54] PROCESS FOR PRODUCING POLYIMIDES IN GLYCOL
3 Claims, No Drawings

| [52] | U.S. Cl. | 260/78 TF, 260/78 S |
|---|---|---|
| [51] | Int. Cl. | C08g 20/32 |
| [50] | Field of Search | 260/78 TF |

[56] References Cited
UNITED STATES PATENTS

| 3,423,366 | 1/1969 | De Brunner | 260/78 X |
|---|---|---|---|
| 3,506,583 | 4/1970 | Boram et al. | 260/78 X |

FOREIGN PATENTS

| 1,478,134 | 3/1967 | France | 260/78 |
|---|---|---|---|
| 6,704,840 | 10/1967 | Netherlands | 260/78 |

*Primary Examiner*—Howard E. Schain
*Attorney*—William A. Hoffman

ABSTRACT: The present invention relates to a process for producing polyimides in which both the formation of intermediate products, the polyamide acids, and also the formation of polyimides, for example, at two different temperatures, are carried out in glycol, and recovery of the pure polyimides follows through filtration and drying.

PROCESS FOR PRODUCING POLYIMIDES IN GLYCOL

BACKGROUND OF THE INVENTION

It is known that polyimides can result, for example, from salt melts that are obtained from approximately equimolar amounts of tetracarboxylic acids and diprimary amines. The salt melts must be heated to temperatures of ca. 150°–300° C. Besides, it is known that tetracarboxylic acids, tetracarboxylic acid esters or tetracarboxylic acid dianhydrides can react in a solvent with equimolar quantities of diamines with the formation of salts or preliminary condensation products. After evaporation of the solvent, the preliminary product can be converted into the polymide by heating. Also known is the production of polyimides according to the above-mentioned processes, but without evaporation of the solvent, when the preliminary product is combined at room temperature or slightly higher temperature, in any case somewhat below 100° C., with water-eliminating substances, such as acetic anhydride or maleic anhydride, for example, and catalysts, such as pyridine. The solvent is subsequently evaporated.

An important disadvantage of the known processes is the necessity of evaporating large quantities of solvent, ca. 2.5 to 3 times the quantity of polyimide, to prepare the pure intermediate product, the polyamide acid.

SUMMARY OF THE INVENTION

Surprisingly, it has now been found that, in the same reaction time, without the need for evaporating large quantities of solvents as in the known processes, polyimides can be produced also by undertaking the polyimide formation with solvents.

Namely, it has been found that only a part of the solvent need be evaporated off, if one undertakes the formation of the polyamide acid in solvents that boil above the condensation point. Here, as the condensation point, is designated the temperature at which the dried preliminary product, the polyamide acid, displays a maximum in differential thermal analyses, or at which the solvent begins to become turbid on heating of the reaction solution. At a heating rate of 2°–3° C./min., the condensation temperatures are located between about 140° and 200° C. Especially suitable as a solvent, for example, is glycol (b.p. equals 197.4° C.).

A particular advantage of the process of the invention is the fine graininess of the polyimides condensed in solvents. On the average, the diameter of the polyimide particles produced in this way is about 2.5 microns and, in spite of this, they are very easily filtered. With simple filtration without a pressure filter, the filter cake contains about 60–80 percent of solvent. On using a pressure filter the quantity of solvent can be reduced to ca. 50 percent. This solvent must be evaporated off either by evaporation at normal pressure suitably in an inert gas atmosphere or in a vacuum. However, it may also be expedient to treat the filter cake with steam under pressure and free it of solvent in this way and to dry it. An additional, appropriate variation of the process is to carry out the condensation in a water-soluble solvent such as glycol and, after filtering off the polyimide, to wash this out with water. The finished polyimide is subsequently dried in a known manner.

DESCRIPTION OF PREFERRED EMBODIMENT

Example

Approximately one-half mole of pyromellitic dianhydride (111 g.) recrystallized from acetic anhydride, was dissolved in 600 g. of glycol. Approximately one-half mole of p-phenylenediamine = 58 g. was dissolved in 930 g. of glycol. At 80° C., the dissolved diamine was added dropwise with stirring during 10 minutes to the pyromellitic dianhydride solution located in a round-bottom flask. After 20 minutes the solution was heated. A temperature of 154° C. was reached in about 20 minutes, which was held constant. The first turbidity, which corresponds approximately to the condensation temperature, appeared at 147° C. As polyimide-forming temperature, 154° C. was selected to accelerate the reaction. Through regular removal of samples at intervals of a few minutes, evaporating the samples and their study with infrared spectroscopy—(for polyamide acid, the characteristic–CO–NH–Valence frequency at 6.4 microns was used)—it could be shown that polyimide formation was completely concluded after 90 minutes.

The resulting hot suspension was filtered off using a "Blauband filter" (fine pore filter—Schleicher & Schuell, Dassel, Germany). The filter cake contained 65 percent of glycol. The grain size of the polyimide particles was between 1 and 7 microns and, on the average, it amounted to 2.4 microns. The particles mostly were aggregated and the aggregate size amounted to an average of 35 microns.

What is claimed is:

1. A process for producing particulate polyimides which comprises the successive steps of (a) dissolving at least one tetracarboxylic acid dianhydride in glycol, (b) adding to the solution of (a) a glycol solution of at least one diprimary diamine, (c) heating the resulting mixture to a temperature in the range of 120°–190° C. for a time sufficient to eliminate water and cause precipitation of particulate polyimide (d) recovering polyimide particles from the reaction vessel and (e) removing the residual liquid therefrom.

2. The process of claim 1 wherein the heating in step (c) is carried out at a temperature in the range of 145°–175° C.

3. The process of claim 1 wherein the recovered polyimide particles from step (d) are freed of glycol solvent by passing through steam under pressure.